United States Patent [19]

Ferrano

[11] Patent Number: 4,660,970
[45] Date of Patent: Apr. 28, 1987

[54] METHOD AND APPARATUS FOR THE CONTACT-LESS MEASURING OF OBJECTS

[75] Inventor: Gert Ferrano, Aalen, Fed. Rep. of Germany

[73] Assignee: Carl-Zeiss-Stiftung, Oberkochen, Fed. Rep. of Germany

[21] Appl. No.: 661,297

[22] Filed: Oct. 15, 1984

[30] Foreign Application Priority Data

Nov. 25, 1983 [DE] Fed. Rep. of Germany ....... 3342675

[51] Int. Cl.⁴ ................................................ G01C 3/08
[52] U.S. Cl. .......................................... 356/1; 356/4; 356/376
[58] Field of Search .............. 356/1, 4, 376, 394, 356/398, 375; 250/224

[56] References Cited

U.S. PATENT DOCUMENTS

| | | | |
|---|---|---|---|
| 4,325,639 | 4/1982 | Richter | 356/1 X |
| 4,355,904 | 10/1982 | Balasubramanian | 356/376 |
| 4,411,528 | 10/1983 | Newcomb et al. | 356/394 X |
| 4,427,880 | 1/1984 | Kanade et al. | 356/376 X |

FOREIGN PATENT DOCUMENTS 91132 10/1983 European Pat. Off. .
48205 5/1982 Japan ...................................... 356/1

Primary Examiner—L. T. Hix
Assistant Examiner—D. Rutledge
Attorney, Agent, or Firm—Hopgood, Calimafde, Kalil, Blaustein & Judlowe

[57] ABSTRACT

The invention concerns a method for the optical sensing of workpieces in accordance with the principle of triangulation in which a light spot is projected at an angle onto the object to be measured (13) and the distance from the object (13) is determined from the displacement of the image of the light spot as measured with a position-sensitive detector (10).

In addition, the shape or the area of the light spot is measured by means of an image analysis instrument (3) and the inclination of the surface of the object to the direction of observation is determined therefrom in order to increase the accuracy of the distance determination.

10 Claims, 6 Drawing Figures

METHOD AND APPARATUS FOR THE CONTACT-LESS MEASURING OF OBJECTS

BACKGROUND OF THE INVENTION

When measuring workpieces having sensitive surfaces such as, for example, clay or wax models, the customary mechanical contact probes of multicoordinate measuring machines cannot be readily employed since there is the danger that the surface of the object being tested will be scratched or deformed by the probe pin. Sensing methods which operate without workpiece contact are best suited for this measurement.

Thus, it is known from West German OS No. 2,903,529 and OS No. 2,113,522 to measure objects by projecting a generally punctiform light spot onto the object at an angle to the normal to the surface and to produce an image of the light spot on a position-sensitive photoelectric detector by means of an imaging optical system which is inclined to the projection-ray path. From the position of the image of the light spot, the distance from the currently illuminated point of the workpiece is then determined by triangulation. To carry out this method, it is furthemore known to combine the projector and the imaging system into a structural group which is frequently referred to as an "optical probe". And to measure plural points on the object, this probe can be moved over the object by suitable guidance systems.

However, the object distance from the optical probe can be determined without error by this method only if there is no change in the angle which the surface of the object forms with the axes of the probe or if the probe is so guided along the workpiece that the image of the projected light spot always appears in the center of the detector. Otherwise, measurement errors occur, since the magnitude of light-spot deviation from the center position is dependent not only on the object distance but also on the angle between the plane of the object and the projection axis. And to provide for continuous guidance of the probe along the contour of the object, not only results in great expense for control technique but also limits the speed of the measurement, in view of the masses which must be accelerated.

BRIEF STATEMENT OF THE INVENTION

The object of the present invention is to provide an improved measurement method of the character indicated whereby it is possible to eliminate the measurement error resulting from inclinations of the surface of the object.

This purpose is achieved by determining deviations of the shape or size of the light spot from a predetermined reference value, and by using these deviations to determine the inclination of the sensed object surface relative to the axes of the projection and/or imaging optical system.

The advantage of this solution, as compared to the prior technique, is that with the same accuracy of measurement it is possible to obtain an increase in the speed of measurement, since the inclination of the object plane need not be controlled precisely but can be included in the calculation of the measurement result. Also, the ascertained inclination is available as an additional measurement value for each probed point, whereas the prior technique required that inclination be determined indirectly from a plurality of distance measurements.

To determine the shape or size of the image of the light spot, recourse may advantageously be had to known methods of television-image analysis, operating at virtually video speed. Accordingly, it is advisable to use a television camera as the detector, suitably a conventional tube camera or a so-called semiconductor camera which contains a two-dimensional, so-called CCD, array.

It is particularly suitable if an area measurement is effected in order to determine the size of the light spot, thereby averaging out irregularities in the surface of the object.

DETAILED DESCRIPTION

The invention will be described in detail for various embodiments, in conjunction with the accompanying drawings, in which.

Figure 1:
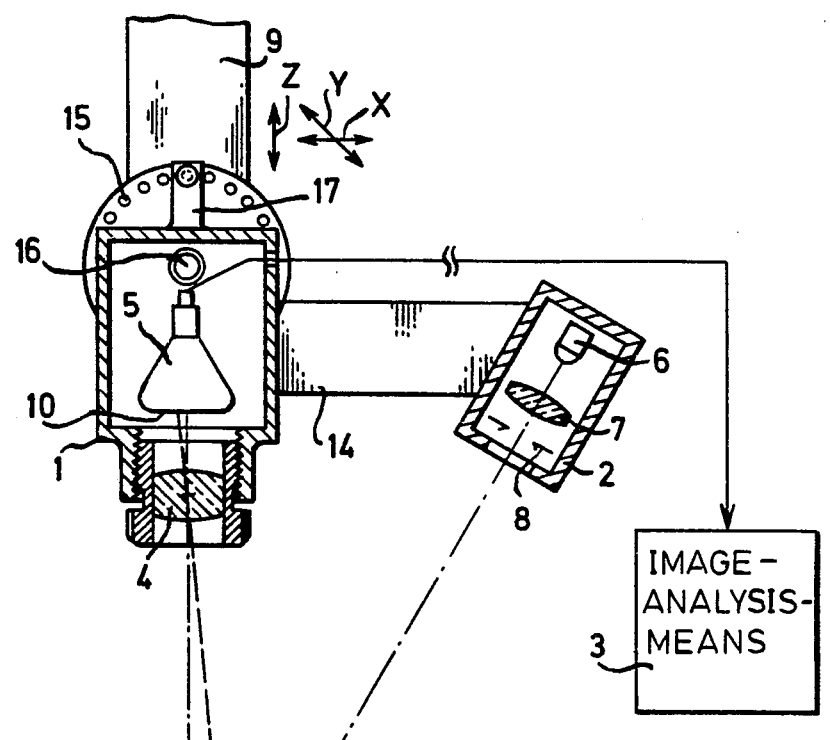
FIG. 1 is a diagram to show one embodiment of the apparatus of the invention, in the context of an observed point on the surface of a workpiece.
Figure 1:
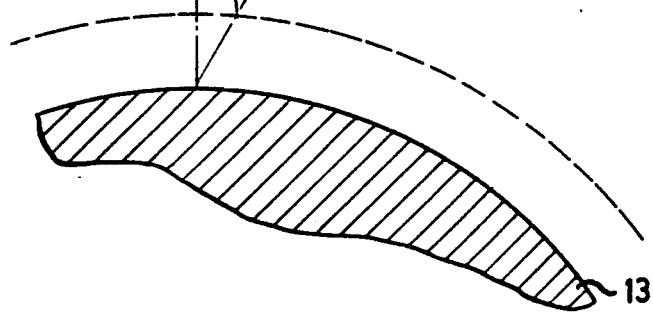
Figure 5:
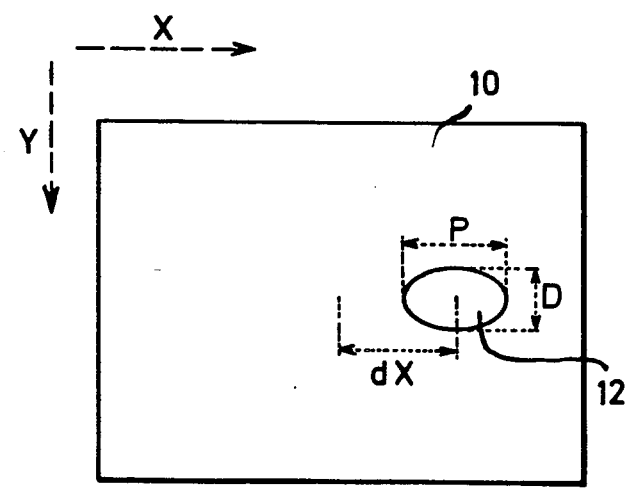
Figure 6:
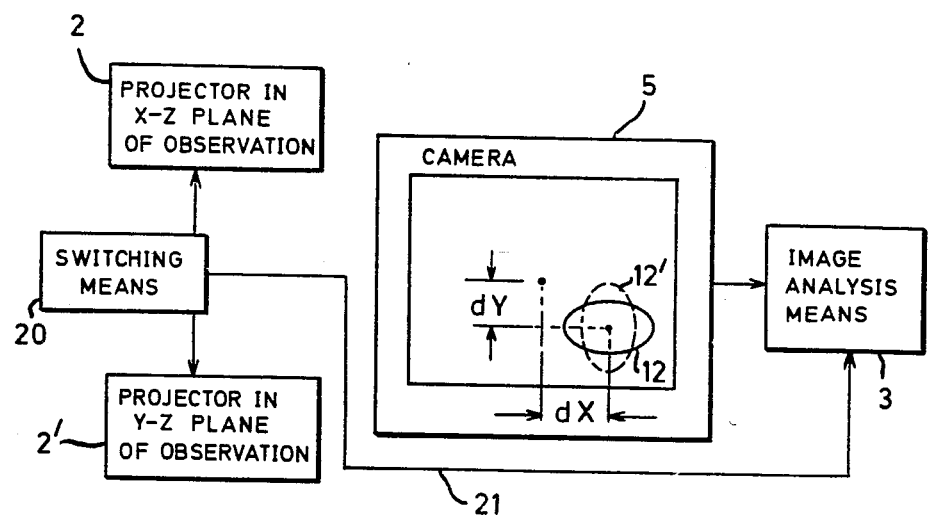

FIG. 5 diagrammatically shows the position and shape of the light spot on the photosensitive surface of the detector used in the apparatus of FIG. 1; and FIG. 6 is a schematic diagram for another embodiment.

The apparatus of FIG. 1 consists essentially of a television camera 1 and a projector 2 which is securely attached to the housing of camera 1 by a holder 14, the projection axis of the projector 2 being arranged at an angle to the viewing direction of the camera 1.

The structural unit consisting of camera 1 and projector 2 is fastened to a probe spindle 9 of a multi-coordinate measuring machine, which spindle is movable in all directions in space. A detent device 15–17 enables this structural unit to be adjustable about an axis 16, into defined angular positions relative to the surface of the object 13 which is to be measured.

The projector 2 contains a light or laser diode 6 which, after collimation by a lens 7, emits a bundle of light, as limited by an aperture 8. The diameter of the spot of light projected in this way onto the object is substantially independent of distance. The spot on the object is imaged via the objective 4 of camera 1 onto the cathode surface 10 of a television tube 5. The camera 1 is connected to an image analysis instrument 3 which determines the distance to the object 13 from the position and shape of the image of the projected light spot and the angle which the axes of projector and camera form with each other. This process will be explained in further detail below with reference to FIGS. 2 to 5.

Figure 2:
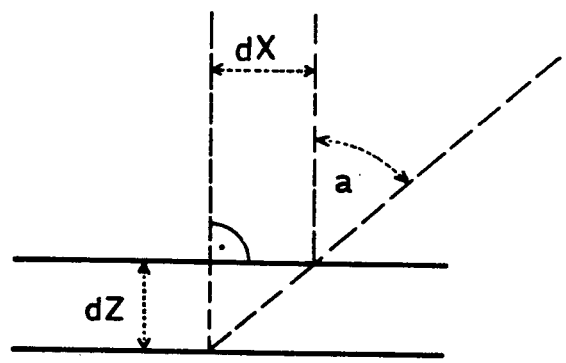
FIGS. 2 to 4 are elemental diagrams serving to explain geometrical relations involved in determining distance of the apparatus of FIG. 1 from the observed point on the workpiece.

The elemental diagram of FIG. 2 illustrates the simple case in which the direction of observation coincides with the line normal to the surface of the of the object 13. In this case, a distance change dZ with respect to the object can be determined solely from the displacement dX of the light spot projected at the angle a as $$dZ = \frac{dX}{\tan(a)}. \tag{1}$$

Figure 3:
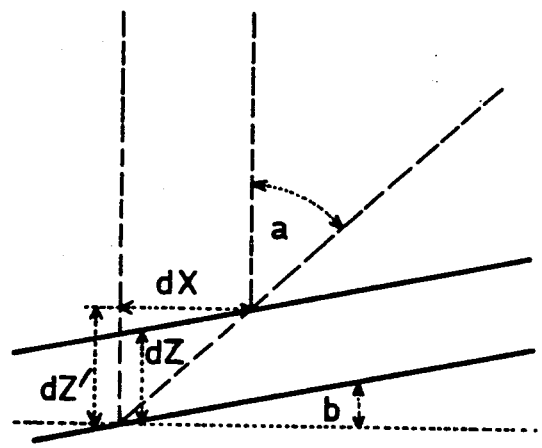

Known optical probes measure the displacement of the light spot by means of a generally uni-dimensional position detector and emply this simple equation (1) for determining the object distance. For these known optical probes, it is necessary to make certain during the measuring process that the probing is actually effected in the direction of the normal. Otherwise, measurement errors occur since, in the event that the normal to the surface of the object is inclined at an angle b to the direction of observation (as in FIG. 3), the approximation (1) no longer applies. Rather, a term which is dependent on the angle of inclination b must be subtracted, and we have:

$$dZ = \frac{dX}{\tan(a)} - dX \cdot \tan(b), \quad (2)$$

which can be realized easily on basis of the geometrical relations sketched in FIG. 3.

The angle b is, as a rule, unknown and may vary continuously from point to point during the course of the measurement, as the probe is moved over the object surface being measured. In accordance with the invention, the angle b is determined by evaluating the shape of the image of the light spot projected onto the surface 13 of the object, the evaluation being performed by the image analysis instrument 3 (FIG. 1).

The light beam cast by projector 2 and limited (in circular shape) by the aperture 8, forms an elliptical light spot on the surface of the object, by reason of the inclined axis of projection, and this spot is then imaged onto the cathode 10 of the tube 5, as shown in FIG. 5. The image 12 of this spot is furthermore shifted from the center of the camera tube by the value dX, which is dependent, inter alia, on the currently applicable object distance.

Figure 4:
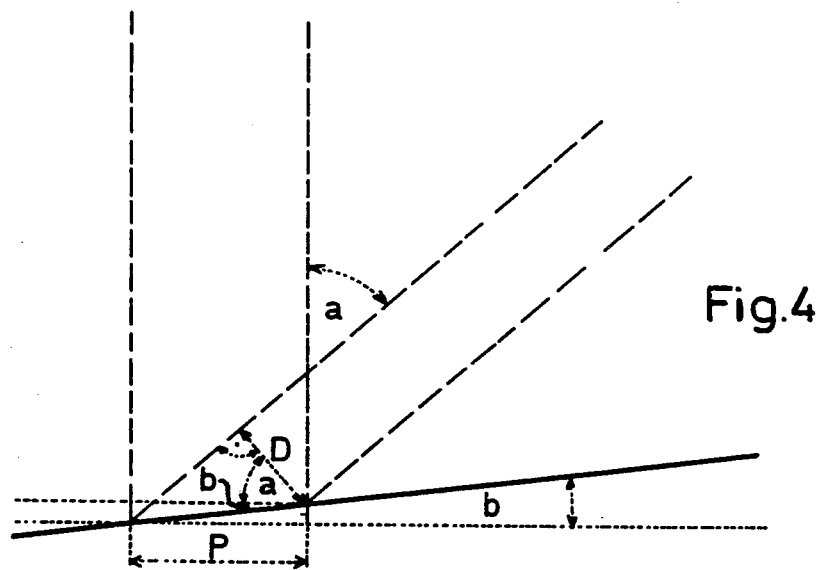

A precise relationship now exists between the ratio of the axes (D/P) of the ellipse 12, the projection angle a and the inclination angle b, which relationship can be derived from the geometrical showing in FIG. 4, namely:

$$\tan b = \frac{1}{\tan(a)} - \frac{D}{P} \cdot \frac{1}{\sin(a)}. \quad (3)$$

To determine the angle of inclination b, the image-analysis instrument 3 carries out a measurement of the area of the image 12 of the light spot. This image-analysis instrument may, for instance, be the "Microvideomat 3" manufactured by the firm of Carl Zeiss of Oberkochen, West Germany.

Since the area F of the ellipse is directly proportional to the axes P and D and since the minor axis D remains constant as a result of the projection geometry, the inclination angle b can be unambiguously calculated from the area F. Furthermore, the image-analysis instrument 3 determines the displacement dX of the centroid of the ellipse 12. From these two measured values dX and F, the distance of the probe from the workpiece can be accurately determined even for the general case of normals to the surface which are inclined to the direction of observation. By combining equation (3) and equation (2), we have $$dZ = \frac{K}{\sin(a)} \cdot \frac{dX}{F}, \quad (4)$$

in which K is a constant which corresponds to the surface area $\pi D^2/4$ of the projected light bundle. This constant is determined by the aperture 8 and can be readily ascertained by a suitable method of calibration.

When measuring the object piece 13 to be examined, for example, the body of an automobile, the probe (which consists of the three structural parts 1, 2 and 14) is moved continuously by the measurement machine (to which it is mounted) along the contour which is to be measured. The value dZ determined by the probe and the image-analysis instrument 3 is continuously added to the measured values of the path-measurement systems in the three axes of the measurement machine. It is clear that in the case shown in FIG. 1 in which the probe measures only in the direction of the Z axis of the machine, the measurement value of the probe need be added only to the values of that measurement system of the multi-coordinate measuring machine which is provided in corresponding manner for the Z axis. However, in the event of a rotary adjustment of the probe about the axis 16, a known correctional factor (dependent on the angle of adjustment) must be applied to the evaluated $\Delta Z$ value to obtain a $\Delta X$ value for summation with X-coordinate data in the measurement machine.

Exact tracking by the probe in the Z direction along the contour of the object 13 is not necessary as long as the image of the light spot projected onto the object 13 is located on the usable region of the cathode 10 of the television tube 5. Only upon excursion of the light spot outside this region, i.e., in the case of relatively large irregularities in the surface of the object, is tracking by the probe necessary.

As a result of the detent device 15–17, assurance is had that even side surfaces of the workpiece 13 which are at a relatively large inclination to the Z axis can be measured by means of the disclosed optical probe.

It will be understood that the described technique is applicable in conjunction with a second projector having a projection axis which forms an angle with the optical axis of the camera 1 in the Z-Y plane. In such event, it is possible to measure the inclination of the object plane 13 not only for the component b in the X-Z plane, but also for the component b' in the direction perpendicular thereto (the Y-Z plane). And in order to prevent an overlapping of the two spots on the screen 10 of the tube 5, the sources of light 6 of the two projectors can, for instance, be cyclically controlled, for time-interlaced sequencing of the respective component evaluations at each measurement point on the object.

Such an arrangement is schematically shown in FIG. 6 wherein the second projector 2' will be understood to have been incorporated in the structural unit 1, 14, 8, such that the axis of the projection-ray path of the second projector 2' intersects the axis of optical-imaging means 4, and such that the geometrical Y-Z plane is defined perpendicular to the X-Z plane of first-projector (2) utilization. Switching means 20 keys the respective projectors (2, 2') in timed interlace, and a synchronizing connection 21 to the image-analysis means 3 enables the latter to synchronously perform its X-component evaluations of the ellipse 12 separately and in interlace with its Y-component evaluations of the ellipse 12'.

What is claimed is:
1. Apparatus for contactless measurement of distance to the surface of an object, said apparatus comprising:
    (a) a light projector for producing a collimated bundle of light along a projection axis to a surface portion of the object, whereby to produce a single light spot on the surface of the object;
    (b) an imaging optical system on an imaging optical axis which is inclined to the projection axis, for imaging the single light spot in an image plane;

(c) a position-sensitive detector at the image plane of said imaging optical system; and (d) image-analysis means connected to process output signals of said detector for determining the lateral offset of the light-spot image with respect to a predetermined reference position of the imaged spot, said image-analysis means including means for area-evaluation of the imaged spot, whereby to determine local inclination of the object surface.

2. Apparatus according to claim 1, characterized by the fact that the detector is a television-tube camera or a two-dimensional CCD camera.

3. Apparatus according to claim 2, characterized by the fact that the projector and the imaging optical system and the camera are combined into a signal structural unit, with the projection axis intersecting the imaging optical axis, thereby defining a single geometric plane.

4. Apparatus according to claim 3, characterized by the fact that said structural unit can be displaced in several coordinate directions and is mounted for selective adjustment of angular orientation about at least one axis (16).

5. Apparatus according to claim 4, characterized by detents for defined setting of the adjusted angle of the structural unit.

6. Apparatus according to claim 3, in which said projector is one of only two like but angularly spaced projectors combined in said structural unit, with the projection axis of the second projector intersecting the imaging optical axis at the same point as the point of intersection by said first-mentioned projection axis, thereby defining a second geometric plane with the imaging-optical axis, said planes being mutually perpendicular.

7. Apparatus according to claim 6, including means for sequencing the operation of said projectors in timed interlace, said means having synchronizing connection to said imaging-analysis means.

8. The contactless method of using a position-sensitive detector to measure distance to the surface of an object, which method comprises:
  (a) projecting a single collimated bundle of light along a projection axis to a surface portion of the object, thereby producing a light spot on the surface of the object, whereby the sectional area of the bundle is substantially independent of object distance;
  (b) optically imaging the light spot at the position-sensitive detector on an imaging axis which is inclined with respect to the projection axis;
  (c) determining distance to the object surface by measuring the lateral offset of the image of the light spot from a predetermined point at the position-sensitive detector;
  (d) measuring the area of the image of the light spot; and
  (e) determining the angle of inclination between said surface portion and the imaging axis by comparing the area of the lightspot image with a predetermined reference value.

9. The method of claim 8, in which the collimated bundle is of circular cross-section.

10. The method of claim 8, in which step (c) is performed by television-image analysis.

* * * * *